Patented Dec. 10, 1940

2,224,356

UNITED STATES PATENT OFFICE 2,224,356

SOLDER AND METHOD OF MANUFACTURE

Walter Momsen, Belleville, Ill., assignor of forty-nine per cent to J. Edward Yoch, Belleville, Ill.

No Drawing. Application November 24, 1939, Serial No. 305,895

1 Claim. (Cl. 148—24)

The object of my invention is to make a solder and disclose the method of manufacturing said solder. The solder finds particular application in soldering metals such as aluminum to aluminum or aluminum to any other metal that will take a tin coating such as brass, copper and many metal alloys, also cast iron and steel, both of a low and a high carbon compound or contents, and to accomplish the soldering with the conventional soldering iron at about the ordinary soldering temperatures.

Applicant's solder does not require excessive high heat, although it is advisable to preheat thick metal that is to be soldered; this will facilitate the soldering operation. No flux is needed in applying solder when aluminum is being soldered to aluminum, but the other metals must be tinned with soldering acid or soldering flux. After the tinned metal part has cooled sufficiently to handle, the acid or flux is washed off with alcohol or any solvent of acid or flux. The solder when applied in the conventional manner forms a very rigid metallic juncture between the metals joined. The solder may be spread evenly on the metal and the soldered joint will not flake or loosen and the jointure will have great strength, both tensile and compressive. The solder may be easily and reasonably made without the application of excessively high temperatures.

With these and other objects in view, my invention has relation to certain novel features of construction and proportion that will be hereinafter more fully described and pointed out in the claim.

Generally the solder is composed of a mixture of metallic zinc, metallic lead, metallic tin, and powdered resin. The zinc has the highest melting point and the tin the lowest melting point of the three metals used.

The process of manufacture is as follows. One quarter ounce of metallic zinc is melted in a ladle, and when this is in a fluid state three quarters of a pound of metallic lead is added, and when this is in a fluid state, it is thoroughly stirred and skimmed. To this mixture is added three quarters of a pound of metallic tin. When this is thoroughly melted, the entire mixture is again stirred and thoroughly skimmed. One half teaspoon of powdered resin is then added to the mixture. Upon the addition of the resin, a flame will form on the top of the mixture in the ladle. When the flame discontinues the mixture is again thoroughly stirred and thoroughly skimmed. This mixture is then poured for commercial use as required. When it cools the solder is ready for use.

In using the solder, the surfaces to be joined are thoroughly scraped and cleaned. With the hot solder iron placed in contact with the solder, a small amount of the solder is permitted to fall onto the surfaces to be soldered. This solder is spread evenly and thinly on the surfaces to be soldered. This process is similar to the tinning process used in conventional soldering. After the tinning is completed, the required amount of soldering may be used to complete the soldering job and thoroughly worked into and over the parts to be soldered.

The specific purpose of the resin is to clean the mixture and to cause the three metals in the mixture to thoroughly unite.

What I claim is:

A method of manufacturing solder which consists in melting one quarter ounce metallic zinc in a container and when melted adding three quarters of a pound of metallic lead to the metallic zinc, stirring and when the lead is thoroughly melted, skimming the mixture, and then adding three quarters of a pound of pure metallic tin to the mixture, and when the tin is melted thoroughly stirring the mixture and then skimming the mixture and then adding one half teaspoon of powdered resin to the mixture which latter will cause a flame to form over the mixture in the container; when the flame subsides, again thoroughly stirring and thoroughly skimming the mixture and then pouring it for commercial use as required.

WALTER MOMSEN.